United States Patent [19]

Wang

[11] Patent Number: 4,966,950

[45] Date of Patent: Oct. 30, 1990

[54] ORIENTED POLYMERIC TAPE

[75] Inventor: Teh-Chuan Wang, Parkersburg, W. Va.

[73] Assignee: E. I. Du Pont de Nemours & Co.

[21] Appl. No.: 165,229

[22] Filed: May 9, 1988

Related U.S. Application Data

[63] Continuation-in-part of Ser. No. 823,656, Jan. 29, 1986, abandoned.

[51] Int. Cl.$^5$ ............................................. C08L 67/02
[52] U.S. Cl. .................................... 525/444; 428/910; 264/210.1
[58] Field of Search .......................... 525/444; 428/910

[56] References Cited

U.S. PATENT DOCUMENTS 3,354,023  1/1967  Dunnington ........................ 428/220
3,907,926  9/1975  Brown ................................. 525/444

FOREIGN PATENT DOCUMENTS 1431916  4/1976  United Kingdom .

Primary Examiner—Patricia Short

[57] ABSTRACT

Oriented polymeric tape of a blend of copolyetherester and polyethylene terephthalate characterized by excellent fray resistance, and a process for its preparation.

2 Claims, 2 Drawing Sheets

ORIENTED POLYMERIC TAPE

CROSS-REFERENCE TO RELATED APPLICATION

This is a continuation-in-part of application Ser. No. 823,656, filed Jan. 29, 1986, now abandoned.

BACKGROUND OF THE INVENTION

Polymeric materials have long been used for the production of tape and strapping material. Polymeric tape has, in the past, been used not only for packaging but power transmission applications such as in automobile window regulator mechanisms.

A wide variety of polymeric material has been used to form polymeric tape structures. Dunnington et al., in U.S. Pat. No. 3,354,023, suggests the use of polyamide, polyester, acetyl and polyolefin resins. It was found by Dunnington et al. that substantially uni-directional orientation was needed for satisfactory performance of crystalline, synthetic thermoplastic resins, and a method of roll orientation to achieve the desired orientation is described therein.

Blends of various polymers have also been suggested for use in tape form. A combination of polybutylene terephthalate and a copolyetherester is described in Brown et al. U.S. Pat. No. 3,907,926, while various polyester blends are shown in British Pat. No. 1,431,916, including blends of polyethylene terephthalate and copolyetherester. Blends of polyester and copolyetherester previously provided improved impact strength when formed into an oriented tape. However, in applications requiring repeated moving contact with another surface, blends of polyethylene terephthalate with copolyetherester have exhibited a tendency to fray, thereby reducing the useful life of such tapes.

SUMMARY OF THE INVENTION

The instant invention provides an oriented polymeric tape which exhibits a markedly lower tendency to fray than previous blends of polyethylene terephthalate and copolyetherester.

Specifically, the instant invention provides an oriented polymeric tape comprising about from 90 to 50 weight percent copolyetherester and, complementally, about from 10 to 50 weight percent of polyethylene terephthalate, the tape exhibiting substantially no fraying at 20 cycles of the Fray Resistance Test.

The invention further provides a process for the preparation of polymeric tape which comprises melt blending about from 90 to 50 weight percent copolyetherester and, complementally, about from 10 to 50 weight percent polyethylene terephthalate at a temperature which is about from 25 to 65 centigrade degrees above the higher crystalline melting point of the two polymeric components for a melt residence period of about from 70 to 225 seconds, extruding the polymer blend through a die orifice in the form of tape, and orienting the tape to provide an increase in the longitudinal dimension of about from 2.2 to 4.0 times the original extruded dimension of the tape.

DETAILED DESCRIPTION OF THE INVENTION

Figure 1:
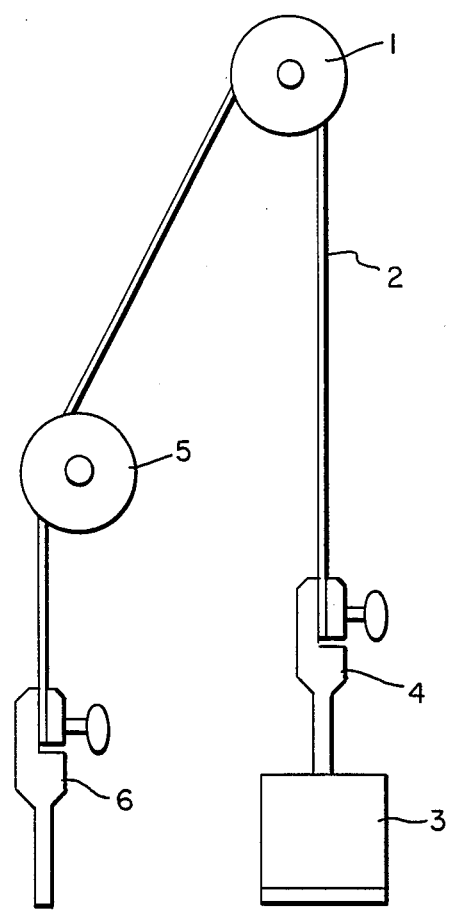
FIG. 1 is a schematic drawing of an apparatus which can be used for the Fray Resistance Test.

The present tapes are prepared from a blend of copolyetherester and polyethylene terephthalate. The copolyetheresters used in the present invention include those described in Brown et al. U.S. Pat. No. 3,907,926, and particularly in that portion of the specification appearing at column 2, line 20 to column 4, line 27. In general, these copolyetheresters have a melting point of about 220° C. and comprise about from 90–50 weight percent of the blend of copolyetherester and polyethylene terephthalate. Preferably, the copolyetherester comprises about from 70 to 65 weight percent of the polymer blend.

The second component of the polymeric blends of the present invention is polyethylene terephthalate. The polyethylene terephthalate comprises about from 10 to 50 weight percent of the blend of copolyetherester and polyester, and preferably about from 30 to 35 weight percent. Polyethylene terephthalate is commercially available from a variety of sources. Generally, the polyethylene terephthalate has a molecular weight of about from 18,000 to 41,000 and a melting point of about from 258° to 260° C.

The two polymeric components, in the desired proportions, are melt blended at an extruder temperature which is about from 25 to 65 centigrade degrees, and preferably 30 to 55 centigrade degrees, higher than the melting point of the higher melting polymer. In general, the temperature of the polymer blend at the die will be about from 285 to 310° C. and a temperature range of about from 290 to 300° C. is particularly preferred. The crystalline melting point is measured according to standard techniques, using, for example, a Differential Scanning Calorimeter (DSC). These melt residence times are greater than those needed to provide a uniform blend of the components.

A wide variety of mixing apparatus can be used for the blending of the polymeric components, as will be evident to those skilled in the art. It has been found particularly convenient to use a twin screw extruder for thorough blending. In a continuous operation, the molten polymer blend, in a twin screw extruder, is exposed to the elevated temperature for a melt residence period of about from 70 to 225 seconds, and preferably about from 80 to 160 seconds. The temperature of the polymer blend, at the die orifice, will be somewhat higher than the barrel temperature of the extruder due to the heat generated by mixing. After blending for the required periods and within the required temperature range, the molten polymer blend is extruded into the form of a tape, substantially as described in Dunnington et al. U.S. Pat. No. 3,354,023. The tape is then oriented, also as described in the Dunnington et al, patent, in the longitudinal direction so as to provide an orientation ratio of about from 2.2 to 4.0:1. In general, an orientation ratio in the longitudinal direction of the tape of about from 2.2 to 3.0 has been found to give particularly good resistance to delamination, and this ratio is accordingly preferred. These orientation ratios are significantly lower than those generally used in the art for preparation of polymeric tapes.

Within the indicated orientation ranges, any convenient orientation techniques can be used, including rolling and stretching. However, for uniform shape of the final product at the present low orientation ratios, roll orientation is preferred.

The final oriented tape can have dimensions consistent with its intended use. In general, the tapes of the present invention will have a width of about from ¼ to 1 inch, and a thickness of about from 10 to 100 mils.

The fraying characteristics of a polymeric tape can be measured on an apparatus of the type shown in FIG. 1, using the Fray Resistance Test. In that test, a tape sample having a width of 0.6 inches is placed over a roll shown as element 1 in FIG. 1. The roll has a diameter of 0.75 inches, and has a standard coarse diamond knurl pattern on the surface. A first end of the tape sample 2 is attached to weight 3 by means of clamp 4. The weight is adjusted to provide a load on the tape of 700 psi. The second end of the tape is passed over idler roll 5 and connected by means of clamp 6 to a cycling drive system, not shown, which oscillates a 4 inch section of the tape over the knurled roll 1. The tape is passed through twenty cycles and examined for surface fraying.

The products of the present invention are characterized by an unusual resistance to fraying and delamination. Typically, blends of copolyetherester and polyethylene terephthalate, when exposed to repeated frictional contact, fray badly, resulting in a highly worn, irregular surface. Tapes prepared from polybutylene terephthalate and copolyetherester exhibit similar difficulties, but the degradation on repeated frictional contact takes the form of delamination or fibrillation instead of fraying. The products of the present invention, prepared using the unusually high melt blending temperatures and low orientation ratios, are markedly resistant to fraying, and delamination, showing substantially no fraying at 20 cycles of the Fray Resistance Test described above.

The improved performance characteristics of the present products are not fully understood. However, the elevated temperatures used in the preparation of these products, combined with the residence times at these elevated temperatures, may result in an improved compatibility of the two components by means of thermal grafting catalyzed by the higher temperatures. This thermal grafting has been indicated by nuclear magnetic resonance analysis. The beneficial use of elevated blending temperatures in the present invention is particularly surprising in view of the general assumption that temperatures substantially in excess of the melting point of the copolyetherester are likely to cause polymer degradation.

The present invention is further illustrated by the following examples and comparative examples, in which parts and percentages are by weight, unless otherwise indicated.

EXAMPLES 1-3 AND COMPARATIVE EXAMPLES A-D

Seven tapes were prepared from a melt blend of 70 parts by weight of copolyetherester commercially available from E. I. du Pont de Nemours and Company as Hytrel ® 7246 elastomer and 30 parts by weight of polyethylene terephthalate commercially available from Goodyear Chemical Company as Vituf 9504 and having a molecular weight of about 36,000 and an inherent viscosity of 0.95. In all of the examples and comparative examples, the polymeric components were uniformly blended. In all examples and comparative examples, the two polymeric components were melt blended in a twin screw extruder, extruded and oriented by rolling in the longitudinal direction to form a tape having a width of 0.6 inch and a thickness of about 0.075 inch. The crystalline melting point of the copolyetherester was 222° C. and that of the polyester was 260° C.

In the examples and comparative examples, different temperature profiles were used as shown in Table I. The polymer blend was molten at zone 3 of each Example, and the residence time calculated from that point. In the comparative examples, blended at the lower temperature, the melt at the die exit was opaque. With increasing blending and extrusion temperatures, and at all temperatures tested in excess of 285° C., the melt at the die exit was translucent. The blending and extrusion temperatures used in the various examples are summarized in the following Table I:

TABLE I

| | OPERATING CONDITIONS | | | | | | |
|---|---|---|---|---|---|---|---|
| Example | 1 | 2 | 3 | A | B | C | D |
| Extrusion Temp. (°C.) | | | | | | | |
| Zone 1 | 244 | 240 | 247 | 246 | 231 | 239 | 250 |
| Zone 2 | 294 | 292 | 302 | 250 | 257 | 250 | 279 |
| Zone 3 | 290 | 298 | 296 | 248 | 249 | 254 | 290 |
| Zone 4 | 310 | 303 | 305 | 268 | 268 | 270 | 290 |
| Zone 5 | 301 | 301 | 301 | 252 | 252 | 252 | 252 |
| Zone 6 | 305 | 298 | 295 | 258 | 259 | 261 | 285 |
| Zone 7 | 303 | 293 | 298 | 254 | 247 | 245 | 290 |
| Zone 8 | 301 | 302 | 301 | 251 | 250 | 251 | 290 |
| Zone 9 (Die) | 298 | 298 | 298 | 238 | 238 | 238 | 280 |
| Screw Speed (RPM) | 90 | 90 | 90 | 90 | 90 | 90 | 90 |
| Extrusion Rate (PPH) | 110 | 110 | 110 | 110 | 110 | 110 | 110 |
| Residence Time in Molten State (Seconds) | 80 | 80 | 80 | 80 | 80 | 80 | 80 |
| Melt Temp. (°C.) | 306 | 307 | 307 | 252 | 254 | 254 | 280 |
| Melt Appearance | TRANSLUCENT | | | OPAQUE | | | |
| Pull Rolls Speed (Ft/Min) | 22 | 22 | 22 | 22 | 22 | 22 | 22 |
| Billet Weight (gm/10 ft) | 400 | 389 | 398 | 392 | 392 | 394 | 398 |
| Tape Weight (gm/ 10 ft) | 140 | 110 | 107 | 120 | 106 | 137 | 106 |
| Orientation Ratio | 2.86 | 3.54 | 3.64 | 3.27 | 3.70 | 2.88 | 3.75 |

Figure 2:
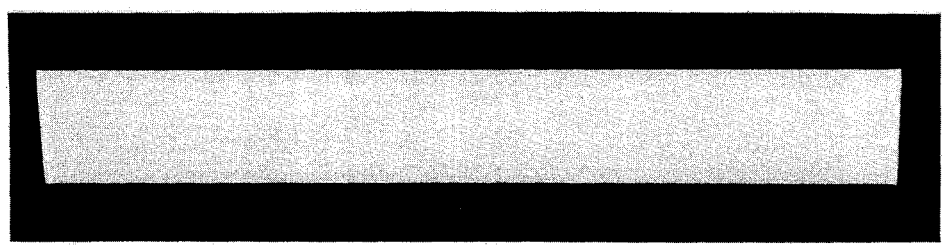
FIGS. 2 and 3 are photographs of the surfaces of tapes of the present intention and the prior art, respectively, after testing for fray resistance.
Figure 3:
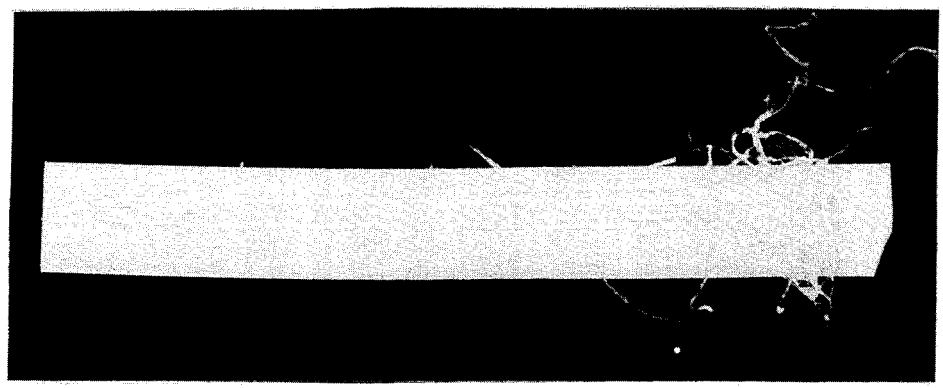

The tapes were tested for tensile properties and for fray resistance by the Fray Resistance Test. The results of the testing, which are summarized on Table II, indicate that the tapes prepared according to the present examples exhibited excellent fray resistance, while the tapes using the lower extrusion temperatures, Comparative Examples A to D, showed extensive fraying after testing. FIG. 2 is a photograph of a tape of Example 3 after testing by the Fray Resistance Test. FIG. 3 is a photograph of a tape of Comparative Example B, having been oriented at approximately the same ratio, after testing by the Fray Resistance Test.

TABLE II

| | PHYSICAL PROPERTIES | | | | | |
|---|---|---|---|---|---|---|
| Example | 1 | 2 | 3 | A | B | C |
| Melt Temp. (°C.) | 306 | 307 | 307 | 252 | 254 | 254 |
| Orientation Ratio | 2.86 | 3.54 | 3.64 | 3.27 | 3.70 | 2.88 |
| Initial Modulus (psi) | 285,000 | 317,000 | 349,000 | 325,000 | 338,000 | 290,000 |
| Tensile Strength (psi) @ 5% | 8,100 | 8,500 | 9,500 | 9,200 | 10,100 | 8,750 |

TABLE II-continued

| Example | PHYSICAL PROPERTIES | | | | | |
|---|---|---|---|---|---|---|
| | 1 | 2 | 3 | A | B | C |
| Elongation @ 10% | 12,160 | 10,900 | 13,900 | 12,100 | 13,500 | 11,600 |
| Elongation @ Break: | 18,300 | 19,700 | 26,900 | 21,100 | 28,700 | 20,100 |
| Fray Resistence | | | Excellent | | | Poor |

EXAMPLES 4-8

In Examples 4-8, the general procedure of Example 1 was repeated, except that the polyethylene terephthalate used varied in inherent viscosity, as shown in the following Table III.

TABLE III

| Example | PET Inherent Viscosity | Molecular Weight |
|---|---|---|
| 4 | 1.04 | 41,000 |
| 5 | 0.95 | 36,000 |
| 6 | 0.72 | 24,000 |
| 7 | 0.64 | 20,000 |
| 8 | 0.59 | 18,000 |

The tapes resulting rom these examples were tested and found to exhibit excellent fray resistance.

EXAMPLES 9-11 AND COMPARATIVE EXAMPLES E-G

The general procedure of Examples 1-3 and Comparative Examples A-D was repeated, using blend ratios of copolyetherester to polyethylene terephthalate of 90/10, 80/20, and 70/30, for Examples 9 and E, 10 and F, and 11 and G, respectively. The resulting tape samples were evaluated as before, and those tapes prepared using elevated extrusion temperature according to the present invention showed excellent fray resistance while all others made with lower extrusion temperatures showed poor fray resistance.

EXAMPLE 12 AND COMPARATIVE EXAMPLE H

The general procedure of Example 1 was repeated, except that the tape was oriented 3.65x. In Example 12 the residence time in the extruder in the molten state was 80 seconds while in Example H the melt residence time was 60 seconds. In Example H, the components were uniformly blended after the completion of the 60 seconds. However, the change in melt appearance from translucent to opaque had not taken place. By contrast, the blend of Example 12, having been maintained in the molten state for 80 seconds, exhibited the change from opaque to translucent, indicating that thermal grafting had taken place. The resulting tapes were evaluated, and the tape with the longer residence time showed excellent fray resistance while the tape prepared from polymer having the shorter residence time exhibited poor fray resistance.

On the basis of the test results in the several examples, fray resistance did not vary with the orientation ratio but only with the melt temperature and the residence time. When melt temperatures and residence times were used as required in the present invention, these temperatures and residence times resulted in a change in melt appearance from opaque to translucent. This change is believed to reflect a thermal grafting of the two components of the blend. With these process parameters and the resulting appearance change, the desired fray resistance was obtained.

I claim:

1. An oriented polymeric tape comprising about from 90 to 50 weight percent copolyetherester and, complementally, about from 10 to 50 weight percent of polyethylene terephthalate, the tape exhibiting substantially no fraying at 20 cycles of the Fray Resistance Test.

2. A tape of claim 1 comprising about from 65 to 70 weight percent copolyetherester and about from 35 to 30 weight percent polyethylene terephthalate.

* * * * *